(12) United States Patent
Winston

(10) Patent No.: US 12,508,250 B2
(45) Date of Patent: Dec. 30, 2025

(54) COMPOSITIONS AND METHODS FOR TREATING NEUROLOGICAL DISORDERS

(71) Applicant: Thomas Winston, Stillwell, KS (US)

(72) Inventor: Thomas Winston, Stillwell, KS (US)

( * ) Notice: Subject to any disclaimer, the term of this patent is extended or adjusted under 35 U.S.C. 154(b) by 0 days.

(21) Appl. No.: 17/397,216

(22) Filed: Aug. 9, 2021

(65) Prior Publication Data

US 2022/0133700 A1    May 5, 2022

Related U.S. Application Data

(60) Provisional application No. 63/198,612, filed on Oct. 29, 2020.

(51) Int. Cl.

| | |
|---|---|
| *A61K 31/436* | (2006.01) |
| *A61K 31/05* | (2006.01) |
| *A61K 31/155* | (2006.01) |
| *A61K 31/198* | (2006.01) |
| *A61K 31/232* | (2006.01) |
| *A61K 31/352* | (2006.01) |
| *A61K 31/522* | (2006.01) |
| *A61K 31/7072* | (2006.01) |
| *A61K 36/68* | (2006.01) |
| *A61K 38/07* | (2006.01) |
| *A61P 5/28* | (2006.01) |
| *A61P 25/08* | (2006.01) |
| *A61P 25/28* | (2006.01) |

(52) U.S. Cl.
CPC ............ *A61K 31/436* (2013.01); *A61K 31/05* (2013.01); *A61K 31/155* (2013.01); *A61K 31/198* (2013.01); *A61K 31/232* (2013.01); *A61K 31/352* (2013.01); *A61K 31/522* (2013.01); *A61K 31/7072* (2013.01); *A61K 36/68* (2013.01); *A61K 38/07* (2013.01); *A61P 5/28* (2018.01); *A61P 25/08* (2018.01); *A61P 25/28* (2018.01)

(58) Field of Classification Search
CPC .................................................. A61K 31/198
See application file for complete search history.

(56) References Cited

U.S. PATENT DOCUMENTS

| | | | |
|---|---|---|---|
| 12,220,405 B2 * | 2/2025 | Winston ..................... A61P 1/16 |
| 12,220,406 B2 * | 2/2025 | Winston ............... A61K 31/232 |
| 2009/0286879 A1 * | 11/2009 | Hashizume .......... A61K 31/232 |
| | | | 514/560 |
| 2011/0111014 A1 * | 5/2011 | Langston ................ A61K 38/29 |
| | | | 514/567 |
| 2012/0184624 A1 * | 7/2012 | Schweiger ........... A61K 31/155 |
| | | | 514/635 |
| 2014/0142172 A1 * | 5/2014 | Cole ........................ A23L 33/12 |
| | | | 514/456 |
| 2015/0044138 A1 * | 2/2015 | Lansbergen ......... A61K 31/375 |
| | | | 424/9.2 |
| 2018/0214452 A1 * | 8/2018 | Lee ..................... A61K 31/5377 |
| 2021/0361921 A1 * | 11/2021 | McAninch ........... A61K 9/0021 |
| 2021/0379025 A1 * | 12/2021 | Winston ............... A61K 31/155 |
| 2021/0379027 A1 * | 12/2021 | Winston ................. A61K 45/06 |
| 2021/0386716 A1 * | 12/2021 | Winston ............... A61K 31/232 |
| 2021/0401812 A1 * | 12/2021 | Winston ................. A61K 38/22 |
| 2022/0304986 A1 * | 9/2022 | Winston ................. A61K 33/18 |
| 2022/0409567 A1 * | 12/2022 | Winston ............... A61K 31/198 |

FOREIGN PATENT DOCUMENTS

| | | | | |
|---|---|---|---|---|
| CN | 105147654 A1 | 12/2015 | | |
| WO | WO-2008089212 A1 * | 7/2008 | ........... A61K 31/155 |
| WO | WO-2018038599 A1 * | 3/2018 | | |

OTHER PUBLICATIONS

Chalabi, "Preventing neurodegenerative disease" Brain vol. 144 pp. 1279-1280 doi:10.1093/brain/awab151 (Year: 2021).*

Dazert et al., "mTOR signaling in disease" Current Opinion in Cell Biology vol. 23 pp. 744-755 DOI 10.1016/j.ceb.2011.09.003 (Year: 2011).*

Shirooie et al., "Targeting mTORs by omega-3 fatty acids: A possible novel therapeutic strategy for neurodegeneration?" Pharmacological Research vol. 135 pp. 37-48 DOI 10.1016/j.phrs.2018.07.004 (Year: 2018).*

Luchtman et al., "Ethyl-eicosapentaenoate (E-EPA) attenuates motor impairments and inflammation in the MPTP-probenecid mouse model of Parkinson's disease" Behavioral Brain Research vol. 226 pp. 386-396 doi:10.1016/j.bbr.2011.09.033 (Year: 2011).*

Jlang et al., "Rapamycin protects the mitochondria against oxidative stress and apoptosis in a rat model of Parkinson's disease" International Journal of Molecular Medicine vol. 31 pp. 825-832 DOI: 10.3892/ijmm.2013.1280 (Year: 2013).*

(Continued)

*Primary Examiner* — Eric Olson
(74) *Attorney, Agent, or Firm* — Sandberg Phoenix & von Gontard, PC; Tracey S. Truitt

(57) ABSTRACT

Disclosed herein are pharmaceutical compositions for the treatment of neurologic disorders comprising an effective amount of one or more mTOR inhibitors and/or one or more BDNF inducers and optionally an effective amount of one or more thyroid hormones. Further disclosed herein are methods of treating or preventing neurologic disorders comprising administering an effective amount of a pharmaceutical composition comprising one or more mTOR inhibitors and/or one or more BDNF inducers and optionally an effective amount of one or more thyroid hormones.

18 Claims, No Drawings

(56) References Cited

OTHER PUBLICATIONS

Kumar et al., "Enhanced oral bioavailability and neuroprotective effect of fisetin through its SNEDDS against rotenone-induced Parkinson's disease rat model" Food and Chemical Toxicology vol. 144 pp. 1-11 DOI: 10.1016/j.fct.2020.111590 (Year: 2020).*
Nandini et al., "Envisioning the neuroprotective effect of Metformin in experimental epilepsy: A portrait of molecular crosstalk" Life Sciences vol. 233 pp. 1-7 DOI: 10.1016/j.lfs.2019.116686 (Year: 2019).*
Jurik et al., "A Binding Mode Hypothesis of Tiagabine Confirms Liothyronine Effect on γ-Aminobutyric Acid Transporter 1 (GAT1)" Journal of Medicinal Chemistry vol. 58 pp. 2149-2158 DOI: 10.1021/jm5015428 (Year: 2015).*
Meng et al., "Ethyl-eicosapentaenoate modulates changes in neurochemistry and brain lipids induced by parkinsonian neurotoxin 1-methyl-4-phenylpyridinium in mouse brain slices" European Journal of Pharmacology vol. 649 pp. 127-134 doi:10.1016/j.ejphar.2010.09.046 (Year: 2010).*
Wong, "Rapamycin for Treatment of Epilepsy: Antiseizure, Antiepileptogenic, Both, or Neither?" Epilepsy Currents vol. 11 No. 2 pp. 66-68 (Year: 2011).*
Das et al., "Antiepileptic effect of fisetin in iron-induced experimental model of traumatic epilepsy in rats in the light of electrophysiological, biochemical, and behavioral observations" Nutritional Neuroscience vol. 20 No. 4 pp. 255-264 DOI 10.1080/1028415X.2016.1183342 (Year: 2017).*
Rajput et al., "The Effect of Daily versus Weekly Levothyroxine Replacement on Thyroid Function Test in Hypothyroid Patients at a Tertiary Care Centre in Haryana" European Thyroid Journal vol. 6 pp. 250-254, DOI: 10.1159/000477348 (Year: 2017).*
Grebe et al., Treatment of Hypothyroidism with Once Weekly Thyroxine* Journal of Clinical Endocrinology and Metabolism vol. 82 No. 3 pp. 870-875 (Year: 1997).*
Tassell et al., "Pharmacokinetics of L-Triiodothyronine in Patients Undergoing Thyroid Hormone Therapy Withdrawal" Thyroid vol. 29 No. 10 pp. 1371-1379, DOI: 10.1089/thy.2019.0101 (Year: 2019).*

* cited by examiner

COMPOSITIONS AND METHODS FOR TREATING NEUROLOGICAL DISORDERS

FIELD

The field of the disclosure relates generally to compositions for the treatment of neurological disorders. More specifically, the field of disclosure relates generally to compositions for the treatment of neurological disorders that include mammalian target of rapamycin (mTOR) inhibitors and/or brain derived neurotropic factor (BDNF) inducers and optionally an effective amount of one or more thyroid hormones. More specifically, the field of disclosure relates to treating degenerative neurological disorders including Alzheimer's disease, Parkinson's disease, Huntington's disease, Supranuclear palsy, Amyotrophic Lateral Sclerosis (ALS) and other disorders of the brain.

BACKGROUND

Neurological disorders include a wide range of diseases such as Alzheimer's disease, Parkinson's disease, Huntington's disease, Supranuclear Palsy, and Amyotrophic Lateral Sclerosis (ALS). Much research has been conducted and many treatment modalities have been aimed at these disorders with some progress being made in recent years. The treatments available, however, are not reparative and mainly treat symptoms of the disorders. Examples include the administration of medications, surgical treatments and physical therapy. New treatment approaches are needed.

BRIEF DESCRIPTION

Disclosed herein is a pharmaceutical composition for the treatment of neurological disorders including an effective amount of one or more mTOR inhibitors and/or one or more BDNF inducers and optionally an effective amount of one or more thyroid hormones.

In another aspect, disclosed herein is a method of treating or preventing neurological disorders in a patient, including administering an effective amount of one or more mTOR inhibitors and/or one or more BDNF inducers and optionally an effective amount of one or more thyroid hormones.

DETAILED DESCRIPTION

In the following specification and the claims, reference will be made to a number of terms, which shall be defined to have the following meanings. The singular forms "a," "an," and "the" include plural references unless the context clearly dictates otherwise. The terms "comprising," "including," and "having" are intended to be inclusive and mean that there may be additional elements other than the listed elements. "Optional" or "optionally" means that the subsequently described event or a circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "patient" refers to a warm-blooded animal such as a mammal which is the subject of a medical treatment for a medical condition that causes at least one symptom. It is understood that at least humans, dogs, cats, and horses are within the scope of the meaning of the term. In some embodiments, the patient is human. Generally, as used herein, the term "patient" means a human or an animal for which the composition of the disclosure may be administered.

As used herein, the terms "treat", "treating", and "treatment" include inhibiting the pathological condition, disorder, or disease, e.g., arresting or reducing the development of the pathological condition, disorder, or disease or its clinical symptoms; or relieving the pathological condition, disorder, or disease, e.g., causing regression of the pathological condition, disorder, or disease or its clinical symptoms. These terms encompass also therapy and cure. Treatment means any manner in which the symptoms of a pathological condition, disorder, or disease are ameliorated or otherwise beneficially altered.

As used herein, the term "prevent" and "preventing" includes administration of a composition which reduces the frequency of, or delays the onset of, symptoms of a medical condition in a subject relative to a subject which does not receive the composition.

As used herein, the term "neurological disorder" refers to diseases of the central and peripheral nervous system, including the brain, spinal cord, cranial nerves, peripheral nerves, nerve roots, autonomic nervous system, neuromuscular junction, and muscles. Examples of neurological disorders include epilepsy and other seizure disorders, Alzheimer's disease and other dementias, Huntington's disease, supranuclear palsy, cerebrovascular diseases including stroke, migraine and other headache disorders, multiple sclerosis, Parkinson's disease and other movement disorders, neuroinfections, brain cancers, traumatic disorders of the nervous system due to head trauma, neurological disorders as a result of malnutrition, and related disorders.

As used herein, the term "mTOR complex 1 (mTORC1)" refers to a protein complex comprising mTOR, regulatory-associated protein of mTOR (RAPTOR), mammalian lethal with SEC13 protein 8 (mLST8), proline-rich AKT substrate of 40 kDa (PRAS40) and DEP domain-containing protein 6 (DEPTOR) that has been described to function as a nutrient/energy/redox sensor; regulator of cellular growth, proliferation, and motility; and controller of protein synthesis with roles in inflammation, autophagy and cell survival.

As used herein, the term "mTOR complex 2 (mTORC2)" refers to a protein complex comprising mTOR, mLST8, DEPTOR, rapamycin-insensitive companion of mTOR (RICTOR), mammalian stress-activated protein kinase interacting protein 1 (mSIN1), and protein observed with rictor 1 and 2 (PROTOR1/2) that has been described to function as an activator of insulin receptors and insulin-like growth hormone factor 1 receptors; and regulator of cell proliferation, cell migration and cytoskeletal remodeling with roles in signaling the production of cytokines, inflammation and cell survival.

As used herein, the term "mTOR inhibitor (mTOR Inhibitor)" refers to a composition that either directly or indirectly inhibits one or more functions of mTOR, mTORC1, mTORC2 and combinations thereof. Examples of suitable mTOR inhibitors include omega-3 fatty acid derivatives, biguanide antihyperglycemic agents, flavonoids, macrolides, and other agents that effectively inhibit one or more mTOR protein complex functions.

As used herein, the term "brain derived neurotropic factor inducers (BDNF inducers)" refers to a composition that either directly or indirectly induces one or more functions of BDNF. Examples of suitable BDNF inducers may include omega-3 fatty acid derivatives, biguanide antihyperglycemic agents, macrolides, resveratrol, vitamin B derivatives, such as nicotinamide riboside, quercetin, vitamin D derivatives, Bacopa monnieri leaf extract, curcumin, magnesium threonate, turmeric, caffeine, and other agents that effectively induce BDNF.

As used herein, the term "thyroid hormone" refers to a composition that is either equivalent to, a derivative of, or affects the same functions as triiodothyronine (T3). Examples of suitable thyroid hormones include liothyronine.

Without being bound by theory, it is believed that the pathology of various neurologic disorders involves an underlying synaptic dysfunction. Part of the dysfunction may be related to DNA mutations and part may be due to membrane abnormalities that accumulate over time. For example, neuronal death may lead to accumulation of abnormal proteins in the brain. Cellular structures such as microtubules may also be left behind. In some instances, these cellular structures may serve to form Beta Amyloid and Tau protein plaques which add to a toxic environment in the brain. There may also be an aggregation of the protein alpha-synuclein, which may be associated with Apolipoprotein E (APOE) as well as others. This may be additive to plaque formation and other deleterious changes in the brain.

Without being bound by theory, it is also believed that the composition of the neuronal and mitochondrial membranes may be key elements for the maintenance of cellular function and architecture. It is believed that abnormalities of the membrane may degrade cellular function over time and ultimately cause the death of the cells. Part of the maintenance of the cell membrane may involve maintaining an optimal ratio of Omega-6 fatty acids to Omega-3 fatty acids in the cellular membrane. It is believed that, over time, with oxidative stress, changes within the genes, such as mTOR gene regulation, may lead to degradation of the Omega-6 to Omega-3 ratio, as well as abnormal cell metabolism.

Examples of Omega-3 fatty acids include eicosapentaenoic acid (EPA) and docosahexaenoic acid (DHA), which are generally derived from diet. It is believed that Omega-6 fatty acids (e.g. arachidonic acids) are precursors to the formation of cytokines. It is believed that Omega-3 fatty acids may help to decrease cytokine production, for example, from the action of eicosanoid molecules. Accordingly, a decrease of Omega-3 fatty acids, in relation to arachidonic acid, may facilitate an inflammatory response caused by cytokines. An increase in cytokines may not only be damaging to cell synapses, but ultimately may lead to cellular death. It is believed that increasing the ratio of omega-3 to omega-6 fatty acids will lead to a decrease or an inhibition of cytokine production and will strengthen cell walls. It is believed that EPA is superior to DHA for inhibition of inflammation and maintaining cell integrity. It is also believed that certain flavonoids, such as fisetin, decrease the production of certain eicosanoid molecules that promote inflammatory cytokines.

Without being bound by theory, it is believed that Omega-3 fatty acids may downshift cellular inflammation and dysfunction by decreasing cytokine formation. This may increase the maintenance of cellular adhesion and normal membrane anatomy with better sodium, potassium and calcium channel function and better response to stimuli from hormones, cell signaling proteins and other cell signaling substances such as nitric oxide. Omega-3 fatty acids may also facilitate the maintenance of membranes of mitochondria and other intracellular structures.

It is further believed that control over mTOR genes may also be of importance in the prevention of degenerative brain disease. It is believed that mTOR gene complexes may respond to stimuli that alter cellular metabolism and growth. The gene complexes may be involved in many diseases and almost all tissues of the body, including the brain. The mTOR genes may be linked with other proteins and may be divided into two distinct complexes—mTORC1 and mTORC2. The functions of mTORC1 are believed to include the regulation of cellular growth, proliferation, motility, survival, and autophagy, as well as promoting protein synthesis and inflammation The functions of mTORC2 are believed to include activation of insulin receptors and insulin-like growth hormone factor 1 receptors, regulation of cell proliferation, migration, survival, and cytoskeletal remodeling, as well as signaling the production of cytokines and promoting inflammation. It is believed that the dysregulation of mTORC1 and mTORC2 may be an underlying cause of disease over one's lifetime. It is also believed that overactivity of these protein complexes may lead to neurological disorders. It is further believed that treatments that include one or more mTOR inhibitors may enhance the treatment and prevention of neurological disorders.

Some of the cellular changes that occur in neurological disorders are believed to be associated with an increase in omega-6 to omega-3 fatty acids in the cellular membranes that may result in an interference with the normal presentation and function of certain membrane-bound receptors including cell bound enzymes, calcium channels, sodium channels, potassium channels and other signaling proteins. As a result, the membrane bound proteins can become less responsive to stimuli including hormones, cell signaling proteins and cell signaling substances, which may in part be due to oxidative stress over time leading to changes in mTOR complex gene regulation and degradation of the omega-3 to omega-6 fatty acid ratio in cellular membranes. This may become a self-reinforcing mechanism of cellular membrane abnormality, leading to dysfunctional mTor activity, and leading to further abnormality or mitochondrial dysfunction.

Without being bound by theory, is it also believed that inflammation and improper immune response associated with neurological disorders is promoted by inflammatory cytokines and other chemicals, some of which are released from cell membranes as a result of an imbalance of the ratio of omega-3 to omega-6 fatty acids as well as mTOR dysfunction, and some of which are released from senescent cells that accumulate over time.

Without being bound by theory, it is also believed that mTORC1 and mTORC2 control multiple diffuse aspects of cellular metabolism, cellular integrity, cellular death, immune response and inflammation. It is believed that the mTORC1 and mTORC2 activity is enhanced and driven upwards by cytokine release and that mTORC1 and mTORC2 complex functions may be downregulated by the use of mTOR inhibitors. Examples of suitable mTOR inhibitors may include omega-3 fatty acid derivatives, biguanide antihyperglycemic agents, flavonoids, macrolides, and other agents that effectively inhibit mTOR protein complexes.

It is also believed that biguanide antihyperglycemic agents act through inhibition of the mTORC2 complex to modulate cell functions including metabolism, proliferation, migration and survival as well as reduce oxidative stress and inflammation. Metabolic effects may include effects on cell survival and growth, and aspects of cell metabolism This, over time, gives rise to abnormal senescent cells producing abnormal metabolites leading to disease. By downregulating mTORC1 and mTORC2, these abnormal cells will be less likely to survive and, therefore, their abnormal or toxic waste will not build up.

Without being bound by theory, it is believed that certain flavonoids act as senolytic agents by reducing mTOR complex activity, increasing the activity of sirtuins, and increasing the activity of AMP-activated protein kinase (AMPK). These actions are believed to play a role in cellular energy homeostasis and promotion of apoptosis in senescent cells that are resistant to signaling proteins and accumulate during the aging process. It is further believed that the accumulation of senescent cells results from a weakened immune system related to aging, and these cells provide a source of chronic inflammation through the release of inflammatory chemicals and may lead to an increased risk of neurological disorders. It is also believed that the mechanistic actions of certain flavonoids used in combination with a biguanide antihyperglycemic agent and a macrolide can exhibit synergistic effects for promoting apoptosis in senescent cells while promoting homeostasis in normal cells. It is further believed that when certain flavonoids are combined with certain galactomannans, the absorption of the certain flavonoids can be increased by as much as 25-fold.

Without being bound by theory, it is also believed that a combination of anti-inflammatory and senolytic drugs, including mTOR inhibitors, can enhance metabolic activity and improve cellular function, which can lead to benefits for patients being treated for neurological disorders. It is also believed that a composition comprised of one or more mTOR inhibitors may be more effective if the composition is comprised of at least two or more mTOR inhibitors.

It is believed that decreased mTOR activity can lead to increased senolytic cell death, which causes an increase in lipids, which can cause a repetitive pathway further affecting mTOR activity. Omega-3 fatty acids, such as icosapent ethyl, are believed to increase plasma lipoprotein lipase activity, which breaks down triglycerides into fatty acids and glycerol, resulting in subsequent enhancement of lipid metabolism by the citric acid cycle. As a result, icosapent ethyl is believed to decrease lipoproteins, which decreases mTOR activity. Decreasing mTOR activity is also believed to lead to increased senolytic activities including cell death. Cell death further increases lipid availability, which is taken into cells and metabolized to create cellular ATP by the beta oxidation of fatty acids. Certain flavonoids, including fisetin, acting at least as a senolytic, are believed to enhance the activity of icosapent ethyl by causing cellular breakdown. Fisetin is also believed to affect the PI3K/AKT/mTOR pathway by downregulating the signaling pathway and enhancing senolytic activity leading to cellular death. Fisetin is also believed to decrease inflammatory chemical production and/or release in the body, which is expected to decrease the risk of many other diseases associated with or exacerbated by inflammation and toxins or oxidizing agents. It is also believed that certain flavonoids, such as fisetin, have antioxidant properties and also cause an increase in cellular glutathione levels in neurons, which also promotes neuronal cell preservation through an antioxidant effect, protecting, for example, against reactive oxygen species (ROS).

Thyroid hormones, including e.g. liothyronine (a T3 thyroid hormone), are believed to assist in controlling metabolism by utilizing oxygen and calories for conversion into energy in the mitochondria through the formation of ATP. Thyroid hormones are believed to be necessary for energy production in all organs, especially in muscle, brain, heart, and other tissues. Increased levels of thyroid hormones are believed to affect increased levels of cellular metabolism. Various tests are available to determine thyroid hormone levels, e.g. by measuring the amount of thyroid hormone levels in the blood. It is believed that it is important for the patient to be either euthyroid or made that way by treatment with thyroid hormone. T3 also has a shorter half-life than T4, so T3 is recommended for the treatment of neurological disorders over T4, when being used synergistically with fisetin.

Inhibition of mTOR1 activity by macrolides, such as rapamycin, is believed to assist in blocking metabolism in cells. It is believed that rapamycin is primarily an mTOR1 inhibitor at lower doses and for short treatment cycles, whereas high levels and very prolonged treatment cycles can also inhibit mTOR2 by blocking mTOR2 production by the cell.

It is believed that using a biguanide antihyperglycemic agent, such as metformin, which decreases mTOR2 gene expression, in these treatment regimens will allow for down regulation of mTOR2 safely without causing significant side effects of high-dose rapamycin, including insulin resistance, hyperglycemia, immune deficiency, and potentially contribute to the generation of cancer. The addition of a flavonoid, such as fisetin, is believed to provide the added benefit of promoting apoptosis or cell death effectuated at least partly through its inhibition of the mTOR pathway. The effects of fisetin may be further improved with the addition of a T3 thyroid hormone. It is believed that synergy of activity of fisetin can be achieved with T3 being added to the senolytic dose of fisetin. The combination of rapamycin, metformin, and fisetin work synergistically and provide a low risk of side effects. The treatment regimens may further benefit from the addition of an omega-3 fatty acid derivative, which is believed to downregulate mTOR2, decrease cytokine formation, and strengthen cell membranes and structures. Additionally, the addition of a T3 thyroid hormone is believed to enhance the effectiveness of the therapy regimen. These combination therapies are believed to have minimal side effects and may be administered continuously over long periods of time. It is also believed that an upregulation of the PI3/AKT pathway is associated with neurological disorders, which pathway is effectively downregulated with administration of an effective amount of mTOR inhibitors, such as icosapent ethyl, fisetin and rapamycin, especially when enhanced with a thyroid hormone, such as T3. It is further believed that mTORC1 genes code for proteins facilitating mRNA function. Limiting this at an optimal level promotes apoptosis, and also decreases dysfunctional toxic protein release.

Without being bound by theory, brain derived neurotropic factor (BDNF) is a protein, encoded by the BDNF gene, that is a member of the neurotrophin family of growth factors. It is believed that BDNF promotes cell survival, especially of neurons. BDNF is also believed to improve the growth, maturation and maintenance of neurons, the growth of dendritic connections between neurons, and the differentiation of neurons from stem cells in the brain. BDNF is further believed to facilitate normal neuronal function and may help maintain presynaptic connection and development. BDNF, and its related neurotrophic factors are found in the brain and its periphery and are believed to be neuroprotective and induce short- and long-term synaptic interactions as required for memory and cognition. Loss of BDNF is associated with neurological disorders including Alzheimer's disease, multiple sclerosis, Parkinson's disease, Huntington's disease and other nervous system related disorders. This loss is exacerbated by inflammation and the presence of toxic metabolic waste.

It is also believed that chronic inflammation from the body, which at least partially crosses the blood brain barrier, and inflammation of the brain, decrease the production of BDNF and leads to neurological diseases. Therefore, the combination of mTOR inhibitors that decrease inflammation with BDNF inducers that increase BDNF activity are believed to be effective in treating and/or preventing neurological disorders. It is believed that BDNF inducers that increase BDNF only in certain areas of the brain, such as selective serotonin reuptake inhibitors (SSRI's), are not as effective as those that act more ubiquitously. Icosapent ethyl is also believed to increase the production of BDNF, at least partially by its reduction of inflammation, which acts to preserve both neuronal cells and their connections.

It is further believed that administration of BDNF inducers may be effective for the treatment and/or prevention of neurological disorders, such BDNF inducers including omega-3 fatty acid derivatives, biguanide antihyperglycemic agents, macrolides, resveratrol, vitamin B derivatives, such as nicotinamide riboside, quercetin, vitamin D derivatives, Bacopa monnieri leaf extract, curcumin, magnesium threonate, turmeric, caffeine, and other agents that effectively induce BDNF.

Without being bound by theory, it is believed that the synthesis of NAD+, which is at least synthesized from vitamin B3, is decreased as we age. It is also believed that NAD+ and adenosine diphosphate ribose have a role in controlling the activity of enzymes involved in cellular homeostasis and energy production through enhanced production of ATP in the mitochondria. Without being bound by theory, it is also believed that magnesium administered as magnesium threonate effectively traverses the blood brain barrier. It is further believed that an increase in magnesium in the brain results in an increase in learning abilities as well as improved long and short term memory, which may be due to an increase in BDNF.

It is also believed that telomerase activators, such as epitalon, act by inducing the activity of telomerase to generate longer telomeres, thus stabilizing DNA and promoting the repair of damaged DNA that would otherwise exacerbate neurological disorders. Telomere length can be measured on peripheral lymphocyte DNA. Telomere length may be used to assess if a telomerase inhibitor is indicated for a particular age group. For example, patients 60 years of age and older may exhibit abnormally short telomere lengths that may warrant treatment with telomerase inhibitors.

It is further believed that uridine 5'-monophosphate disodium increases cognitive function when paired with omega 3 fatty acids, such as DHA and icosapent ethyl. This composition is sometimes also administered with choline; however, a sufficient amount of choline can also be obtained from a diet that includes meat, fish, dairy, and/or eggs. Several studies administering this composition have reported increases in neuronal stabilization and synaptic numbers. It is also believed that the liver especially does not produce enough uridine 5'-monophosphate as we age, resulting in a greater requirement for supplementing older patients.

It is believed that especially effective therapies for the treatment and/or prevention of neurological disorders include administration of compositions that provide the combination of decreasing the activity of the PI3/AKT pathway, decreasing inflammation through the reduction of inflammatory cytokines, improving cell membrane structure, increasing the activity of BDNF, allowing for DNA repair from past injury, and moderating some instances of abnormal RNA transcription in order to facilitate repair of the diseased state.

Without being bound by theory, it is also believed that the especially effective therapies for the treatment and/or prevention of neurological disorders include maintaining vitamin D at normal levels, for example from 50 ng/ml to 70 ng/ml, maintaining normal levels of testosterone and estradiol in men, and maintaining normal levels of estrogen and testosterone in women. This allows for a better environment for success of treatment and allows for normal estradiol levels in both men and women.

In various embodiments, the compositions of the disclosure include compositions for the treatment and/or prevention of neurological disorders. In various embodiments, the compositions of the disclosure include an effective amount of one or more mTOR inhibitors and/or one or more BDNF inducers and optionally an effective amount of one or more thyroid hormones.

In various embodiments, the compositions of the disclosure may include an effective amount of one or more mTOR inhibitors. In various embodiments, suitable mTOR inhibitors may include omega-3 fatty acid derivatives, biguanide antihyperglycemic agents, flavonoids, macrolides, and other agents that effectively inhibit mTOR protein complexes.

In various embodiments, the compositions of the disclosure may include an effective amount of one or more BDNF inducers. In various embodiments, suitable BDNF inducers may include omega-3 fatty acid derivatives, biguanide antihyperglycemic agents, macrolides, resveratrol, vitamin B derivatives, such as nicotinamide riboside, quercetin, vitamin D derivatives, Bacopa monnieri leaf extract, curcumin, magnesium threonate, turmeric, caffeine, and other agents that effectively induce BDNF.

In various embodiments, the compositions of the disclosure may include an effective amount of one or more thyroid hormones, In various embodiments, suitable thyroid hormones may include a T3 hormone, such as liothyronine.

Preferentially, at least one of the components of the composition will increase telomere length. Preferentially, at least one of the components include a telomerase activator, such as epitalon or metformin.

Preferentially, at least one of the components of the composition will decrease the rate of normal cell death or will increase the life span of normal cells including neurons and cells involved in immune response systems.

Preferentially, at least one of the components of the composition will decrease inflammation associated with neurological disorders.

Preferentially, at least one of the components of the composition will enhance cellular membrane integrity and function and/or induce apoptosis in senescent cells. Preferentially, the compositions of the disclosure include a flavonoid, such as fisetin, at doses that are high enough to cause senescent cells to die and results in an overall decrease in inflammation in the patient.

Preferentially, other than promoting euthyroid in patients, the compositions of the disclosure includes one or more thyroid hormones concurrent with high doses of a flavonoid, such as fisetin to increase the effects of high doses of fisetin.

Preferentially, the compositions of the disclosure will result in the combination of decreasing the activity of the PI3/AKT pathway, decreasing inflammation through the reduction of inflammatory cytokines, improving cell membrane structure, increasing the activity of BDNF, allowing for DNA repair from past injury, decreasing certain RNA activity associated with mTORC1 and increasing the number of stem cells produced.

In various embodiments, the compositions may include an effective amount of an omega-3 fatty acid derivative. Suitable omega-3 fatty acid derivatives may include icosapent ethyl. In various embodiments, the compositions of the disclosure may include an effective amount of at least about 0.5 g of icosapent ethyl, or between about 0.5 g to about 10.0 g, or 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 g, or any range between any two of these amounts including about 0.5 g to about 7.5 g, or about 1.0 g to about 6.0 g, or about 2.0 g to about 4.0 g. In some preferred forms, the amount of icosapent ethyl is sufficient to maintain an optimum level of icosapent ethyl in the blood of a patient receiving an administration of the composition.

In various embodiments, the compositions may include an effective amount of a biguanide antihyperglycemic agent. Suitable biguanide antihyperglycemic agents include metformin. In various embodiments, the compositions may include an effective amount of at least about 50 mg of biguanide antihyperglycemic agent, or between about 50 mg to about 4000 mg, or 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, 3000, 3025, 3050, 3075, 3100, 3125, 3150, 3175, 3200, 3225, 3250, 3275, 3300, 3325, 3350, 3375, 3400, 3425, 3450, 3475, 3500, 3525, 3550, 3575, 3600, 3625, 3650, 3675, 3700, 3725, 3750, 3775, 3800, 3825, 3850, 3875, 3900, 3925, 3950, 3975, or 4000 mg or any range between any two of these amounts including about 250 mg to about 4000 mg, about 250 mg to about 500 mg, about 250 mg to about 750 mg, 250 mg to about 1000 mg, about 250 mg to about 1250 mg, about 250 mg to about 1500 mg, or between about 500 mg to about 3000 mg. In some embodiments, the biguanide antihyperglycemic agent may be formulated for immediate, delayed or extended release.

In various embodiments, the compositions may include an effective amount of a flavonoid. Suitable flavonoid agents include fisetin and fisetin derivatives. In various embodiments, the compositions may include an effective amount of at least about 10 mg/kg of patient body weight of a flavonoid, or between about 10 mg/kg to about 100 mg/kg of patient body weight, or 10, 15, 20, 25, 30, 35, 40, 45, 50, 55, 60, 65, 70, 75, 80, 85, 90, 95, or 100 mg/kg of patient body weight or any range between any two of these amounts including about 10 mg/kg to about 20 mg/kg, about 15 mg/kg to about 25 mg/kg, about 20 mg/kg to about 30 mg/kg, about 25 mg/kg to about 50 mg/kg, or about 20 mg/kg to about 100 mg/kg of a flavonoid. In some preferred forms, the amount of fisetin is sufficient to maintain an optimum level of fisetin in the blood of a patient receiving an administration of the composition, wherein such optimum level may be achieved by combining the fisetin with a galactomannan to enhance the absorption of the flavonoid. In some preferred forms, the amount of fisetin is as close to the dose of fisetin that is tolerated by the patient. In some preferred forms, the amount of fisetin in the compositions is increased on a daily basis to an optimum level or optimum high dose level of fisetin.

In various embodiments, the compositions may include an effective amount of a flavonoid. Suitable flavonoid agents include fisetin and fisetin derivatives. In various embodiments, the compositions may include an effective amount of at least about 50 mg of a flavonoid, or between about 50 mg to about 750 mg, or 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, or 750 mg or any range between any two of these amounts including about 50 mg to about 500 mg, about 100 mg to about 750 mg, about 250 mg to about 500 mg, about 250 mg to about 750 mg, about 500 mg to about 750 mg, or about 100 mg to about 500 mg of a flavonoid. In some preferred forms, the amount of fisetin is sufficient to maintain an optimum level of fisetin in the blood of a patient receiving an administration of the composition; such optimum level may be achieved by combining the fisetin with a galactomannan to enhance the absorption of the flavonoid. In some preferred forms, the amount of fisetin is as close to the dose of fisetin that is tolerated by the patient. In some preferred forms, the amount of fisetin in the compositions is increased on a daily basis to an optimum level or optimum high dose level of fisetin.

In various embodiments, the compositions may include an effective amount of a macrolide. Suitable macrolides include rapamycin and rapamycin derivatives, such as temsirolimus, everolimus, and ridaforolimus. In various embodiments, the compositions may include an effective amount of a macrolide of at least about 0.1 mg of a macrolide, or between about 0.1 mg to about 40 mg, or 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 mg or any range between any two of these amounts including about 2.0 mg to about 6.0 mg, about 1.0 mg to about 10.0 mg, about 2.0 mg to about 4.0 mg, about 2.5 mg to about 5.0 mg, about 2.5 mg to about 7.5 mg, about 4.0 mg to about 30 mg, about 6.0 mg to about 40 mg, or about 1.0 mg to about 5.0 mg of a macrolide. In some preferred forms, the amount of rapamycin is administered as a loading dose followed by a lower daily dose. In some preferred forms, the amount of rapamycin is sufficient to maintain an optimum level of rapamycin in the blood of a patient receiving an administration of the composition; such optimum level may be determined as a preferred optimum trough level as measured in nanograms per ml of blood. In some preferred forms, the administration of rapamycin is provided intermittently at low levels to avoid high dose side effects.

In various embodiments, the compositions may include an effective amount of a thyroid hormone. Suitable thyroid hormones include the T3 liothyronine. In various embodiments, the compositions of the disclosure may include an effective amount of at least about 1 μg of liothyronine, or between about 1 μg to about 250 μg, or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250 μg, or any range between any two of these amounts including about 5 μg to about 150 μg, or about 10 μg to about 100 μg, or about 10 μg to about 25 μg, or about 25 μg to about 150 μg, or about 25 μg to about 250 μg. In some preferred embodiments, thyroid hormones are not administered on a daily basis and administration does not exceed three days per week. In some preferred methods, the administration of thyroid hormones is dependent upon the clinical response and tolerance of the patient and may continue long-term including many years. In some preferred forms, the amount of liothyronine is sufficient to maintain an optimum level of liothyronine in the blood of a patient receiving an administration of the composition. In various embodiments, the compositions may include a combination of an effective amount of one or more thyroid hormones with either an effective amount of a flavonoid or a high dose of a flavonoid, wherein only some of the compositions that include an effective amount of a flavonoid also include an effective amount of one or more thyroid hormones. For example, an effective amount of one or more thyroid hormones may be included only in one of two weekly compositions administered that includes an effective amount of a flavonoid or a high dose of a flavonoid, which composition could be either the first or second composition administered that includes the flavonoid or high dose flavonoid.

In various embodiments, the composition may include an effective amount of resveratrol. In various embodiments, the composition may include an effective amount of at least about 100 mg of resveratrol, or between about 100 mg to about 4000 mg, or about 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, 3000, 3025, 3050, 3075, 3100, 3125, 3150, 3175, 3200, 3225, 3250, 3275, 3300, 3325, 3350, 3375, 3400, 3425, 3450, 3475, 3500, 3525, 3550, 3575, 3600, 3625, 3650, 3675, 3700, 3725, 3750, 3775, 3800, 3825, 3850, 3875, 3900, 3925, 3950, 3975, or 4000 mg of resveratrol, or from 100 mg to about 4000 mg of resveratrol.

In various embodiments, the compositions may further include an effective amount of a vitamin B derivative. Suitable vitamin B derivatives include nicotinamide riboside. In various embodiments, the compositions include an effective amount of at least about 50 mg of nicotinamide riboside, or about 50 mg to about 1000 mg of nicotinamide riboside, including about 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, and 1000 mg, or any range between any two of these amounts, or about 100 mg to about 750 mg, or about 200 mg to about 600 mg of nicotinamide riboside. In various embodiments, the compositions including nicotinamide riboside may be further supplemented with adenosine diphosphate ribose.

In various embodiments, the composition further includes an effective amount of quercetin. In various embodiments, the composition may include an effective amount of at least about 100 mg of quercetin, or about 100 mg to about 1000 mg of quercetin, including about 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, or 2000 mg of quercetin, or about 100 mg to about 2000 mg of quercetin, or about 500 mg to about 1000 mg of quercetin.

In various embodiments, the composition further includes an effective amount of a vitamin D derivative. Suitable vitamin D derivatives include vitamin D3 (cholecalciferol). In various embodiments, the composition includes an effective amount of at least about 500 international units (IU) of vitamin D3, or about 500 IU to about 10000 IU of vitamin D3 daily, including 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900,1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, 5000, 5050, 5100, 5150, 5200, 5250, 5300, 5350, 5400, 5450, 5500, 5550, 5600, 5650, 5700, 5750, 5800, 5850, 5900, 5950, 6000, 6050, 6100, 6150, 6200, 6250, 6300, 6350, 6400, 6450, 6500, 6550, 6600, 6650, 6700, 6750, 6800, 6850, 6900, 6950, 7000, 7050, 7100, 7150, 7200, 7250, 7300, 7350, 7400, 7450, 7500, 7550, 7600, 7650, 7700, 7750, 7800, 7850, 7900, 7950, 8000, 8050, 8100, 8150, 8200, 8250, 8300, 8350, 8400, 8450, 8500, 8550, 8600, 8650, 8700, 8750, 8800, 8850, 8900, 8950, 9000, 9050, 9100, 9150, 9200, 9250, 9300, 9350, 9400, 9450, 9500, 9550, 9600, 9650, 9700, 9750, 9800, 9850, 9900, 9950, or 10000 IU of vitamin D3.

In various embodiments, the composition further includes an effective amount of Bacopa monnieri leaf extract. In various embodiments, the composition may include an effective amount of at least about 1000 mg, or about 1000 mg to about 4000 mg, including about 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, 3000, 3025, 3050, 3075, 3100, 3125, 3150, 3175, 3200, 3225, 3250, 3275, 3300, 3325, 3350, 3375, 3400, 3425, 3450, 3475, 3500, 3525, 3550, 3575, 3600, 3625, 3650, 3675, 3700, 3725, 3750, 3775, 3800, 3825, 3850, 3875, 3900, 3925, 3950, 3975, or 4000 mg of Bacopa monnieri, or about 1000 mg to about 4000 mg of Bacopa monnieri, or about 1500 mg to about 3000 mg of Bacopa monnieri.

In various embodiments, the composition may include an effective amount of curcumin. In various embodiments, the composition of the disclosure may include an effective amount of at least about 0.5 g, or about 0.5 g to about 12.0 g, including about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, or 12.0 g of curcumin, or about 0.5 g to about 6.0 g, or about 1.0 g to about 8.0 g, or about 2.0 g to 10.0 g, or about 3.0 g to 12.0 g of curcumin.

In various embodiments, the compositions may further include an effective amount of magnesium threonate. In various embodiments, the compositions may include an effective amount of at least about 100 mg of magnesium threonate or about 100 mg to about 3000 mg, including about 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, or 3000 mg, or any range between any two of these amounts, or about 300 mg to about 1500 mg, or about 1000 mg to about 3000 mg of magnesium threonate.

In various embodiments, the composition further includes an effective amount of a uridine 5'-monophosphate disodium. It is believed that uridine 5'-monophosphate disodium can cause an increase in cognitive function when used in combination with DHA. In various embodiments, the composition includes an effective amount of at least about 300 mg of uridine 5'-monophosphate disodium, or about 300 mg to about 1000 mg of uridine 5'-monophosphate disodium, including about 300, 325, 350, 375, 400, 425, 450, 475, 500, 525, 550, 575, 600, 625, 650, 675, 700, 725, 750, 775, 800, 825, 850, 875, 900, 925, 950, 975, and 1000 mg or from about 300 mg to about 800 mg, or about 500 mg to 1000 mg of uridine 5'-monophosphate disodium.

In various embodiments, the composition further may include an effective amount of turmeric. In various embodiments, the composition may include an effective amount of at least about 1.0 g, or about 1.0 g to about 8.0 g, including about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8.0 g of turmeric, or about 1.0 g to about 5.0 g, or about 3.0 to about 8.0 g of turmeric.

In various embodiments, the composition further may include an effective amount of a telomerase activator. In various embodiments, suitable telomerase activators include epitalon, and epitalon derivatives. In various embodiments, the composition may include an effective amount of at least about 1.0 mg, or about 1.0 mg to about 10.0 mg, including about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0 mg of epitalon, or about 1.0 mg to about 5.0 mg, or about 3.0 mg to about 10.0 mg of epitalon on a monthly basis, or based on the patient's condition.

In various embodiments, the composition further may include an effective amount of caffeine. In various embodiments, the composition may include an effective amount of at least about 0.5 mg/kg, or about 0.5 mg/kg to about 5.0 mg/kg, including about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 mg/kg of caffeine, or about 1.0 mg/kg to about 2.5 mg/kg, or about 2.0 mg/kg to about 4.0 mg/kg of caffeine.

In various embodiments, the compositions may include an effective loading dose of one or more mTOR inhibitors followed by an effective amount of a daily dose of one or more mTOR inhibitors. In various embodiments, the compositions may include an effective loading dose of one or more mTOR inhibitors followed by an effective amount of a weekly dose of one or more mTOR inhibitors.

In various embodiments, the compositions may include an effective amount of a combination of thyroid hormones. Suitable thyroid hormones for combination include the T3 liothyronine. In various embodiments, the compositions may include an effective amount of a combination of one or more thyroid hormones with an effective amount of a flavonoid to lower antioxidant levels. In various embodiments, the compositions may include an effective amount of one or more thyroid hormones and an effective amount of a high dose of a flavonoid, which is associated with a senolytic effect. In various embodiments, the compositions may include an effective amount of one or more thyroid hormones with an effective of either a flavonoid or a high dose flavonoid only in certain daily administrations of compositions including a flavonoid.

In various embodiments, the compositions may include an effective amount of a combination of one or more mTOR inhibitors with an effective amount of one or more thyroid hormones. In various embodiments, the compositions may include an effective amount of one or more mTOR inhibitors with an effective amount of one or more thyroid hormones and an effective amount of a flavonoid. In various embodiments, the compositions may include an effective amount of one or more mTOR inhibitors with an effective amount of one or more thyroid hormones and an effective amount of a high dose of a flavonoid, which is associated with a senolytic effect.

In various embodiments, the compositions may include an effective amount of a combination of one or more BDNF inducers with an effective amount of one or more thyroid hormones. In various embodiments, the compositions may include an effective amount of one or more BDNF inducers with an effective amount of one or more thyroid hormones and an effective amount of a flavonoid. In various embodiments, the compositions may include an effective amount of one or more BDNF inducers with an effective amount of one or more thyroid hormones and an effective amount of a high dose of a flavonoid, which is associated with a senolytic effect.

In various embodiments, the compositions may include an effective amount of a combination of one or more mTOR inhibitors with one or more BDNF inducers. In various embodiments, the compositions may include an effective amount of one or more mTOR inhibitors and one or more BDNF inducers with an effective amount of one or more thyroid hormones. In various embodiments, the compositions may include an effective amount of one or more mTOR inhibitors and one or more BDNF inducers with an effective amount of one or more thyroid hormones and an effective amount of a flavonoid. In various embodiments, the compositions may include an effective amount of one or more mTOR inhibitors and one or more BDNF inducers with an effective amount of one or more thyroid hormones and an effective amount of a high dose of a flavonoid, which is associated with a senolytic effect.

In various embodiments, the composition of the disclosure may further contain additional pharmaceutically acceptable carriers. The pharmaceutical composition may, for example, be in a form suitable for oral administration as a tablet, capsule, pill, powder, sustained release formulation, solution or suspension, in a form suitable for parenteral injection as a sterile solution, suspension, or in a form of an emulsion for topical administration as an ointment or cream or for rectal administration as a suppository. The pharmaceutical composition may be in unit dosage forms suitable for single administration of precise dosages. The pharmaceutical composition may include conventional pharmaceutical carriers or excipients. In addition, the compositions may include other medicinal or pharmaceutical agents, carriers, adjuvants, etc.

In various embodiments, the composition may be administered to a patient through any suitable route of administration effective in delivering an amount of active agent or active agents to a patient. Suitable routes of administration include oral, parenteral, enteral, rectal or the like.

In some forms, the composition will comprise each of the ingredients in a single administration form, such as a pill, tablet, capsule, oral solution, injection solution, infusion solution, or any of the forms described herein. In other forms, the composition may comprise a kit comprising each of the individual ingredients, together with instructions for administering each ingredient. In some forms of the kit, certain ingredients will already be combined such that two, three, or more of the components or ingredients of the composition are in a single administration form as described herein.

Various embodiments of the disclosure further relate to methods of treating neurologic disorders. Various embodiments of the disclosure further relate to methods of treating neurologic disorders that include administering an effective amount of one or more mTOR inhibitors and/or one or more BDNF inducers and optionally an effective amount of one or more thyroid hormones.

In various embodiments, the methods may include administering an effective amount of one or more mTOR inhibitors. In various embodiments, suitable mTOR inhibitors may include omega-3 fatty acid derivatives, biguanide antihyperglycemic agents, flavonoids, macrolides, and other agents that effectively inhibit mTOR protein complexes.

In various embodiments, the methods may include administering an effective amount of one or more BDNF inducers. In various embodiments, suitable BDNF inducers may include omega-3 fatty acid derivatives, biguanide antihyperglycemic agents, macrolides, resveratrol, vitamin B derivatives, such as nicotinamide riboside, quercetin, vitamin D derivatives, Bacopa monnieri leaf extract, curcumin, magnesium threonate, turmeric, caffeine, and other agents that effectively induce BDNF.

In various embodiments, the methods may include administering an effective amount of one or more thyroid hormones. In various embodiments, suitable thyroid hormones may include a T3 hormone, such as liothyronine.

Preferentially, the methods may include administering at least one component of the composition that increases telomere length. Preferentially, the methods may include administering compositions that include a telomerase activator, such as epitalon or metformin.

Preferentially, the methods may include administering at least one component of the composition that decreases the rate of normal cell death or increases the life span of normal cells including neurons and cells involved in immune response systems.

Preferentially, the methods may include administering at least one components of the composition decreases inflammation associated with neurological disorders.

Preferentially, the methods may include administering at least one component of the composition that enhances cellular membrane integrity and function and/or induces apoptosis in senescent cells. Preferentially, the methods may include administering compositions that include a flavonoid, such as fisetin, at doses that are high enough to cause senescent cells to die and results in an overall decrease in inflammation in the patient. Preferentially, the methods may also include administering a macrolide, such as rapamycin, to induce apoptosis by interfering in senescent cell metabolism.

Preferentially, the methods may include administering one or more thyroid hormones concurrent with high doses of a flavonoid, such as fisetin for a purpose other than promoting euthyroid in patients.

Preferentially, the methods may include administering an effective amount of a pharmaceutical composition that results in the combination of decreasing the activity of the PI3/AKT pathway, which promotes apoptosis and changes in cell metabolism, and promoting cell proliferation, cell survival and growth.

Preferentially, the methods may include maintaining vitamin D at normal levels, maintaining normal levels of testosterone and estradiol in men, and maintaining normal levels of estrogen and testosterone in women.

In various embodiments, the methods may include administering an effective amount of an omega-3 fatty acid derivative. Suitable omega-3 fatty acid derivatives may include icosapent ethyl. In various embodiments, the methods may include administering an effective amount of at least about 0.5 g of icosapent ethyl, or between about 0.5 g to about 10.0 g, or 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 g, or any range between any two of these amounts including about 0.5 g to about 7.5 g, or about 1.0 g to about 6.0 g, or about 2.0 g to about 4.0 g once, twice, or three or more times daily. In some preferred methods, the amount of icosapent ethyl is sufficient to maintain an optimum level of icosapent ethyl in the blood of a patient receiving an administration of the composition. In some embodiments, levels of icosapent levels in the blood may be obtained by analysis of red blood cell (RBC) membrane levels.

In various embodiments, the methods may include administering an effective amount of a biguanide antihyperglycemic agent. Suitable biguanide antihyperglycemic agents include metformin. In various embodiments, the methods may include administering an effective amount of at least about 50 mg of biguanide antihyperglycemic agent, or between about 50 mg to about 4000 mg, or 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, 3000, 3025, 3050, 3075, 3100, 3125, 3150, 3175, 3200, 3225, 3250, 3275, 3300, 3325, 3350, 3375, 3400, 3425, 3450, 3475, 3500, 3525, 3550, 3575, 3600, 3625, 3650, 3675, 3700, 3725, 3750, 3775, 3800, 3825, 3850, 3875, 3900, 3925, 3950, 3975, or 4000 mg or any range between any two of these amounts including about 250 mg to about 4000 mg, about 250 mg to about 500 mg, about 250 mg to about 750 mg, 250 mg to about 1000 mg, about 250 mg to about 1250 mg, about 250 mg to about 1500 mg, or between about 500 mg to about 3000 mg once, twice, or three or more times daily.

In various embodiments, the methods may include administering an effective amount of a flavonoid. Suitable flavonoid agents include fisetin and fisetin derivatives. In various embodiments, the methods may include administering an effective amount of at least about 10 mg/kg of patient body weight of a flavonoid, or between about 10 mg/kg to about 100 mg/kg of patient body weight, or 10, 15, 20, 25, 30, 35, 40, 45, 50, 55, 60, 65, 70, 75, 80, 85, 90, 95, or 100 mg/kg of patient body weight or any range between any two of these amounts including about 10 mg/kg to about 20 mg/kg, about 15 mg/kg to about 25 mg/kg, about 20 mg/kg to about 30 mg/kg, about 25 mg/kg to about 50 mg/kg, or about 20 mg/kg to about 100 mg/kg of a flavonoid once, twice, or three or more times daily, weekly, monthly, trimonthly or intermittently with periods between administration when no flavonoid is administered. In some preferred methods, a high dose of fisetin of about 20 mg/kg may be administered for at least one to three days in a row weekly, biweekly, triweekly or monthly. In some preferred methods, the amount of fisetin is sufficient to maintain an optimum level of fisetin in the blood of a patient receiving an administration of the composition; such optimum level may be achieved by combining the fisetin with a galactomannan to enhance the absorption of the flavonoid. In some preferred forms, the amount of fisetin is as close to the dose of fisetin that is tolerated by the patient. In some preferred forms, the amount of fisetin in the compositions is increased on a daily basis to an optimum level or optimum high dose level of fisetin. In some preferred methods, the flavonoid may be administered only one or two days per week, or only one or two days every two weeks, or only one or two days every three weeks or only one or two days per month, bimonthly or trimonthly. In some preferred methods, the flavonoid may be administered each day at the highest specified dose that the patient can tolerate. In various embodiments, the flavonoid or high dose of the flavonoid may include long-term administration, possibly for the life of the patient. In various embodiments, a higher dose of fisetin may be associated with a senolytic effect. In various embodiments, a lower dose of fisetin may be associated with an antioxidant effect. In some preferred forms, the amount of fisetin in the compositions is increased on a daily basis to an optimum level or optimum high dose level of fisetin.

In various embodiments, the methods may include administering an effective amount of a flavonoid. Suitable flavonoid agents include fisetin and fisetin derivatives. In various embodiments, the methods may include administering an effective amount of at least about 50 mg of a flavonoid, or between about 50 mg to about 750 mg, or 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, or 750 mg or any range between any two of these amounts including about 50 mg to about 500 mg, about 100 mg to about 750 mg, about 250 mg to about 500 mg, about 250 mg to about 750 mg, about 500 mg to about 750 mg, or about 100 mg to about 500 mg of a flavonoid once, twice, or three or more times daily, weekly, monthly, trimonthly or intermittently with periods between administration when no flavonoid is administered. In some preferred methods, the lower doses of fisetin are administered with intermittent periods of higher doses of fisetin. In some preferred methods, the amount of fisetin is sufficient to maintain an optimum level of fisetin in the blood of a patient receiving an administration of the composition; such optimum level may be achieved by combining the fisetin with a galactomannan to enhance the absorption of the flavonoid. In some preferred forms, the amount of fisetin is as close to the dose of fisetin that is tolerated by the patient. In some preferred forms, the amount of fisetin in the compositions is increased on a daily basis to an optimum level or optimum high dose level of fisetin. In some preferred methods, the flavonoid may be administered only one or two days per week, or only one or two days every two weeks, or only one or two days every three weeks or only one or two days per month, bimonthly or trimonthly. In some preferred methods, the flavonoid may be administered each day at the highest specified dose that the patient can tolerate. In various embodiments, the flavonoid or high dose of the flavonoid may include long-term administration, possibly for the life of the patient. In various embodiments, a higher dose of fisetin may be associated with a senolytic effect. In various embodiments, a lower dose of fisetin may be associated with an antioxidant effect. In some preferred forms, the amount of fisetin in the compositions is increased on a daily basis to an optimum level or optimum high dose level of fisetin.

In various embodiments, the methods may include administering an effective amount of a macrolide. Suitable macrolides include rapamycin and rapamycin derivatives, such as temsirolimus, everolimus, and ridaforolimus. In various embodiments, the methods may include administering an effective amount of a macrolide of at least about 0.1 mg of a macrolide, or between about 0.1 mg to about 40 mg, or 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 mg or any range between any two of these amounts including about 2.0 mg to about 6.0 mg, about 1.0 mg to about 10.0 mg, about 2.0 mg to about 4.0 mg, about 2.5 mg to about 5.0 mg, about 2.5 mg to about 7.5 mg, about 4.0 mg to about 30 mg, about 6.0 mg to about 40 mg, or about 1.0 mg to about 5.0 mg of a macrolide. In some preferred forms, the amount of rapamycin is administered as a loading dose followed by a lower daily dose. In various embodiments, the macrolide may first be administered as a loading dose of about 4 mg followed by a maintenance dose of about 1 mg to about 2 mg once daily. In some preferred forms, the amount of rapamycin is sufficient to maintain an optimum level of rapamycin in the blood of a patient receiving an administration of the composition; such optimum level may be determined as a preferred optimum trough level as measured in nanograms per ml of blood. In some preferred forms, the administration of rapamycin is provided intermittently at low levels to avoid side effects of higher doses.

In various embodiments, the methods may include administering an effective amount of a thyroid hormone. Suitable thyroid hormones include the T3 liothyronine. In various embodiments, the methods may include administering an effective amount of at least about 1 µg of liothyronine, or between about 1 µg to about 250 µg, or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250 µg, or any range between any two of these amounts including about 5 µg to about 150 µg, or about 10 µg to about 100 µg, or about 10 µg to about 25 µg, or about 25 µg to about 150 µg, or about 25 µg to about 250 µg either weekly, bimonthly, or monthly. In some preferred embodiments, thyroid hormones are not administered on a daily basis and administration does not exceed three days per week. In some preferred methods, the administration of thyroid hormones is dependent upon the clinical response and tolerance of the patient and may continue long-term including many years. In some preferred forms, the amount of liothyronine is sufficient to maintain an optimum level of liothyronine in the blood of a patient receiving an administration of the composition. In various embodiments, the compositions may include a combination of an effective amount of one or more thyroid hormones with either an effective amount of a flavonoid or a high dose of a flavonoid, wherein only some of the compositions that include an effective amount of a flavonoid also include an effective amount of one or more thyroid hormones. For example, an effective amount of one or more thyroid hormones may be included only in one of two weekly compositions administered that includes an effective amount of a flavonoid or a high dose of a flavonoid, which composition could be either the first or second weekly composition administered that includes a flavonoid or high dose flavonoid.

In various embodiments, the methods may include diagnosing thyroid function in each patient prior to administration of an effective amount of a thyroid hormone. In various embodiments, the methods for patients requiring thyroid hormone replacement in order to establish normal thyroid function may preferentially be administered a T3 thyroid hormone. In various embodiments, patients with normal thyroid function may be administered a low dose of a T3 thyroid hormone (e.g. 5 to 10 µg of liothyronine) combined with a high dose of a flavonoid. In various embodiments, the methods may include administering a combination of a low dose of a T3 thyroid hormone and a high dose of a flavonoid that effectively elicits a synergistic effect of increasing metabolism and promoting cellular senescence. In various embodiments, other than promoting euthyroid in patients, the methods include administering a thyroid hormone concurrent with high doses of a flavonoid, such as fisetin.

In various embodiments, the methods may further include administering an effective amount of resveratrol. In various embodiments, the methods may include administering an effective amount of at least about 100 mg of resveratrol, or between about 100 mg to about 4000 mg, or about 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, 3000, 3025, 3050, 3075, 3100, 3125, 3150, 3175, 3200, 3225, 3250, 3275, 3300, 3325, 3350, 3375, 3400, 3425, 3450, 3475, 3500, 3525, 3550, 3575, 3600, 3625, 3650, 3675, 3700, 3725, 3750, 3775, 3800, 3825, 3850, 3875, 3900, 3925, 3950, 3975, or 4000 mg of resveratrol, or from 100 mg to about 4000 mg of resveratrol once or twice daily.

In various embodiments, the methods may further include administering an effective amount of a vitamin B derivative. Suitable vitamin B derivatives include nicotinamide riboside. In various embodiments, the methods may include administering an effective amount of at least about 50 mg of nicotinamide riboside, or about 50 mg to about 1000 mg of nicotinamide riboside, including about 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, and 1000 mg, or any range between any two of these amounts, or about 100 mg to about 750 mg, or about 200 mg to about 500 mg of nicotinamide riboside per 24 hour period, or with an average dose of about 500 mg, or administered once, twice, or three or more times daily. In various embodiments, the methods that include administering nicotinamide riboside may be further supplemented with adenosine diphosphate ribose. In various embodiments, the methods may include administering nicotinamide riboside at a lower daily dose when it is administered in combination with a high dose of fisetin and T3, such lower dose of nicotinamide riboside being about half of the dose administered otherwise.

In various embodiments, the methods may further include administering an effective amount of quercetin. In various embodiments, the methods may include administering an effective amount of at least about 100 mg of quercetin, or about 100 mg to about 1000 mg of quercetin, including about 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, or 2000 mg of quercetin, or about 100 mg to about 2000 mg of quercetin, or about 500 mg to about 1000 mg of quercetin in a single dose or in divided doses administered once, twice, or three or more times daily.

In various embodiments, the methods may further include administering an effective amount of a vitamin D derivative. Suitable vitamin D derivatives include vitamin D3 (cholecalciferol). In various embodiments, the methods may include administering an effective amount of at least about 500 international units (IU) of vitamin D3, or about 500 IU to about 10000 IU of vitamin D3 daily, including 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, 5000, 5050, 5100, 5150, 5200, 5250, 5300, 5350, 5400, 5450, 5500, 5550, 5600, 5650, 5700, 5750, 5800, 5850, 5900, 5950, 6000, 6050, 6100, 6150, 6200, 6250, 6300, 6350, 6400, 6450, 6500, 6550, 6600, 6650, 6700, 6750, 6800, 6850, 6900, 6950, 7000, 7050, 7100, 7150, 7200, 7250, 7300, 7350, 7400, 7450, 7500, 7550, 7600, 7650, 7700, 7750, 7800, 7850, 7900, 7950, 8000, 8050, 8100, 8150, 8200, 8250, 8300, 8350, 8400, 8450, 8500, 8550, 8600, 8650, 8700, 8750, 8800, 8850, 8900, 8950, 9000, 9050, 9100, 9150, 9200, 9250, 9300, 9350, 9400, 9450, 9500, 9550, 9600, 9650, 9700, 9750, 9800, 9850, 9900, 9950, or 10000 IU of vitamin D3 per day administered once, twice, or three or more times daily.

In various embodiments, the methods may further include administering an effective amount of Bacopa monnieri leaf extract. In various embodiments, the methods may include administering an effective amount of at least about 1000 mg, or about 1000 mg to about 4000 mg, including about 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, 3000, 3025, 3050, 3075, 3100, 3125, 3150, 3175, 3200, 3225, 3250, 3275, 3300, 3325, 3350, 3375, 3400, 3425, 3450, 3475, 3500, 3525, 3550, 3575, 3600, 3625, 3650, 3675, 3700, 3725, 3750, 3775, 3800, 3825, 3850, 3875, 3900, 3925, 3950, 3975, or 4000 mg of Bacopa monnieri, or about 1000 mg to about 4000 mg of Bacopa monnieri, or about 1500 mg to about 3000 mg of Bacopa monnieri once, twice, or three or more times daily.

In various embodiments, the methods may include administering an effective amount of curcumin. In various embodiments, the methods may include administering an effective amount of at least about 0.5 g, or about 0.5 g to about 12.0 g, including about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, or 12.0 g of curcumin, or about 0.5 g to about 6.0 g, or about 1.0 g to about 8.0 g, or about 2.0 g to 10.0 g, or about 3.0 g to 12.0 g of curcumin administered once, twice, or three or more times daily.

In various embodiments, the methods may include administering an effective amount of magnesium threonate. In various embodiments, the methods may include administering an effective amount of at least about 100 mg or about 100 mg to about 3000 mg, including about 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, or 3000 mg, or any range between any two of these amounts, or about 300 mg to about 1500 mg, or about 1000 mg to about 3000 mg of magnesium threonate once, twice, or three or more times daily.

In various embodiments, the methods may further include administering an effective amount of a uridine 5'-monophosphate disodium. In various embodiments, the methods may include administering an effective amount of at least about 300 mg of uridine 5'-monophosphate disodium, or about 300 mg to about 1000 mg of uridine 5'-monophosphate disodium, including about 300, 325, 350, 375, 400, 425, 450, 475, 500, 525, 550, 575, 600, 625, 650, 675, 700, 725, 750, 775, 800, 825, 850, 875, 900, 925, 950, 975, and 1000 mg or from about 300 mg to about 800 mg, or about 500 mg to 1000 mg of uridine 5'-monophosphate disodium administered once, twice, or three or more times daily.

In various embodiments, the methods may further include administering an effective amount of turmeric. In various embodiments, the composition may include an effective amount of at least about 1.0 g, or about 1.0 g to about 8.0 g, including about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8.0 g of turmeric, or about 1.0 g to about 5.0 g, or about 3.0 to about 8.0 g of turmeric administered once, twice, or three or more times daily.

In various embodiments, the methods may further include administering an effective amount of caffeine. In various embodiments, the methods may further include administering an effective amount of at least about 0.5 mg/kg, or about 0.5 mg/kg to about 5.0 mg/kg, including about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 mg/kg of caffeine, or about 1.0 mg/kg to about 2.5 mg/kg, or about 2.0 mg/kg to about 4.0 mg/kg of caffeine administered once, twice, or three or more times daily. In some embodiments, the method may include administering a total amount of 180 mg of caffeine in divided doses, for example, 60 mg of caffeine administered three times a day.

In various embodiments, the methods may further include administering an effective amount of a telomerase activator. In various embodiments, suitable telomerase activators include epitalon, and epitalon derivatives. In various embodiments, the methods may include administering an effective amount of at least about 1.0 mg, or about 1.0 mg to about 10.0 mg, including about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0 mg of epitalon, or about 1.0 mg to about 5.0 mg, or about 3.0 mg to about 10.0 mg of epitalon on a monthly basis, or based on the patient's condition. In some embodiments, epitalon may initially be dosed at about 10 mg, subcutaneously or intramuscularly, every 3 days for 5 doses. In other embodiments, epitalon may initially be administered at a dose of about 1 mg subcutaneously or intramuscularly daily for 60 days. In some forms, after the initial dosing, the epitalon dosage will be on a monthly basis.

In various embodiments, the compositions may include an effective loading dose of one or more mTOR inhibitors followed by an effective amount of a daily dose of one or more mTOR inhibitors. In various embodiments, the compositions may include an effective loading dose of one or more mTOR inhibitors followed by an effective amount of a weekly dose of one or more mTOR inhibitors.

In various embodiments, the methods may include administering an effective amount of a combination of one or more thyroid hormones with an effective amount of a flavonoid. In various embodiments, the methods may include administering an effective amount of one or more thyroid hormones and an effective amount of a high dose of a flavonoid, which is associated with a senolytic effect. In various embodiments, the methods may include administering a combination of an effective amount of one or more thyroid hormones with either an effective amount of a flavonoid or a high dose of a flavonoid, wherein only some of the compositions that include an effective amount of a flavonoid also include an effective amount of one or more thyroid hormones. For example, an effective amount of one or more thyroid hormones may be included only in one of two weekly compositions administered that includes an effective amount of a flavonoid or a high dose of a flavonoid, which composition could be either the first or second weekly composition administered that includes a flavonoid or high dose flavonoid.

In various embodiments, the methods may include administering an effective amount of a combination of one or more mTOR inhibitors with an effective amount of one or more thyroid hormones. In various embodiments, the methods may include administering an effective amount of one or more mTOR inhibitors with an effective amount of one or more thyroid hormones and an effective amount of a flavonoid. In various embodiments, the methods may include administering an effective amount of one or more mTOR inhibitors with an effective amount of one or more thyroid hormones and an effective amount of a high dose of a flavonoid, which is associated with a senolytic effect. In various embodiments, the methods may include administering a combination of an effective amount of one or more mTOR inhibitors with an effective amount of one or more thyroid hormones and either an effective amount of a flavonoid or a high dose of a flavonoid, wherein only some of the compositions that include an effective amount of a flavonoid also include an effective amount of one or more thyroid hormones. For example, an effective amount of one or more thyroid hormones may be included only in one of two weekly compositions administered that includes an effective amount of a flavonoid or a high dose of a flavonoid, which composition could be either the first or second composition administered that includes a flavonoid or high dose flavonoid. In various embodiments, the one or more thyroid hormones should be administered for short durations (for example, two days a week, bimonthly, or monthly) during any periods of a dosing regimen that include a high dose of a flavonoid.

In various embodiments, the methods may include administering an effective amount of a combination of one or more BDNF inducers with an effective amount of one or more thyroid hormones. In various embodiments, the methods may include administering an effective amount of one or more BDNF inducers with an effective amount of one or more thyroid hormones and an effective amount of a flavonoid. In various embodiments, the methods may include administering an effective amount of one or more BDNF inducers with an effective amount of one or more thyroid hormones and an effective amount of a high dose of a flavonoid, which is associated with a senolytic effect.

In various embodiments, the methods may include administering an effective amount of a combination of one or more mTOR inhibitors with one or more BDNF inducers. In various embodiments, the methods may include administering an effective amount of one or more mTOR inhibitors and one or more BDNF inducers with an effective amount of one or more thyroid hormones.

In various embodiments, the methods may include administering an effective amount of a combination of one or more mTOR inhibitors and one or more BDNF inducers with an effective amount of one or more thyroid hormones. In various embodiments, the methods may include administering an effective amount of one or more mTOR inhibitors and one or more BDNF inducers with an effective amount of one or more thyroid hormones and an effective amount of a flavonoid. In various embodiments, the methods may include administering an effective amount of one or more mTOR inhibitors and one or more BDNF inducers with an effective amount of one or more thyroid hormones and an effective amount of a high dose of a flavonoid, which is associated with a senolytic effect.

In various embodiments, the methods may include administering the effective amount of the compositions of the disclosure that may further contain additional pharmaceutically acceptable carriers, excipients, other medicinal or pharmaceutical agents, carriers, adjuvants, etc.

In various embodiments, the methods may include administering the effective amount of the compositions to a patient through any suitable route of administration effective in delivering an amount of active agent or active agents to a patient. Suitable routes of administration include oral, intravascular, intramuscular, subcutaneous, parenteral, enteral, and rectal or the like.

In some forms, the composition will comprise each of the ingredients in a single administration form, such as a pill, tablet, capsule, oral solution, injection solution, infusion solution, or any of the forms described herein. In other forms, the composition will comprise a kit comprising each of the individual ingredients, together with instructions for administering each ingredient. In some forms of the kit, certain ingredients will already be combined such that one, two, three, four, or more of the components or ingredients of the composition are in a single administration form as described herein.

EXAMPLE 1

Clinical Study Protocol in Early Dementia, Parkinson's Disease and ALS

A treatment group of 200 people are recruited for study. 100 patients are diagnosed with early dementia, 50 patients are diagnosed with early Parkinson's disease, and 50 patients are diagnosed with ALS. 200 patients with no evidence of a brain degenerative disorder are further recruited as a control group. Patients with a history of taking fish oil for 3 months prior to treatment were excluded.

All patients in the treatment group are administered a combination treatment regimen including rapamycin, icosapent ethyl, metformin, nicotinamide riboside, resveratrol, quercetin, cholecalciferol, Bacopa monnieri leaf extract, uridine 5'-monophosphate disodium, turmeric and epitalon. All patients in the control group are administered other medications not administered to the treatment group.

Tests for cognitive performance and physical strength and agility are conducted in both groups. MRIs both with and without contrast are then conducted to provide anatomy and blood flow measurements. Cerebral spinal fluid levels of B-amyloid and Tau protein are assessed and both groups are checked for an abnormal APOE4 gene. Levels of red blood cells (RBC) and Omega-3 fatty acids are also assessed for both groups.

Testing in both groups is repeated every 6 months on all patient groups for 3 years and results compared between each group every 6 months for 3 years.

EXAMPLE 2

Clinical Study Protocol in Early Dementia, Parkinson's Disease and ALS

A treatment group of at least 200 people are recruited for study. At least one half of the patients are diagnosed with early dementia, at least one quarter of the patients are diagnosed with early Parkinson's disease, and at least one quarter of the patients are diagnosed with ALS. At least 200 patients with no evidence of a brain degenerative disorder are further recruited as a control group. Patients with a history of taking fish oil for 3 months prior to treatment were excluded.

One set of patients in the treatment group are administered a treatment regimen of at least one mTOR inhibitor.

One set of patients in the treatment group are also administered a treatment regimen of at least one mTOR inhibitor and at least one of nicotinamide riboside, quercetin, cholecalciferol, Bacopa monnieri leaf extract, uridine 5'-monophosphate disodium, turmeric, epitalon, and any combination thereof. All patients in the control group are administered other medications not administered to the treatment group.

Tests for cognitive performance and physical strength and agility are conducted in all groups. MRIs both with and without contrast are then conducted to provide anatomy and blood flow measurements. Cerebral spinal fluid levels of B-amyloid and Tau protein are assessed and both groups are checked for an abnormal APOE4 gene. Levels of RBC and Omega-3 fatty acids are also assessed for both groups.

Testing in all groups is repeated every 6 months on all patients for 3 years and results compared between each group every 6 months for 3 years.

This written description uses examples to disclose the subject matter herein, including the best mode, and also to enable any person skilled in the art to practice the subject matter disclosed herein, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method of treating or preventing the progression of neurological disorders selected from the group consisting of epilepsy and Parkinson's disease in a subject in need thereof having normal thyroid function comprising administering to the subject a pharmaceutical composition comprising a first pharmaceutical mixture and a second pharmaceutical mixture, each comprising:
    an effective amount of one or more mTOR inhibitors, an effective amount of one or more BDNF inducers, an effective amount of a telomerase activator, and an effective amount of uridine 5'-monophosphate disodium; and
    wherein said second pharmaceutical mixture further comprises an effective amount of one or more T3 thyroid hormones and the first pharmaceutical mixture does not contain any thyroid hormone:
    wherein the second pharmaceutical mixture is administered three or fewer times per week, and the first pharmaceutical mixture is administered on days when the second pharmaceutical mixture is not administered.

2. The method of claim 1, wherein the one or more mTOR inhibitors of at least one of the first or second pharmaceutical mixtures is selected from the group consisting of: an omega-3 fatty acid derivative, a biguanide antihyperglycemic agent, a flavonoid, a macrolide, and combinations thereof.

3. The method of claim 2, wherein the omega-3 fatty acid derivative of at least one of the first or second pharmaceutical mixtures is icosapent ethyl.

4. The method of claim 2, wherein the biguanide antihyperglycemic agent of at least one of the first or second pharmaceutical mixtures is metformin.

5. The method of claim 2, wherein the macrolide of at least one of the first or second pharmaceutical mixtures is rapamycin.

6. The method of claim 2, wherein the flavonoid of at least one of the first or second pharmaceutical mixtures is fisetin.

7. The method of claim 2, wherein the one or more BDNF inducers of at least one of the first or second pharmaceutical mixtures is selected from the group consisting of: omega-3 fatty acid derivatives, biguanide antihyperglycemic agents, macrolides, resveratrol, vitamin B derivatives, quercetin, vitamin D derivatives, Bacopa monnieri leaf extract, curcumin, magnesium threonate, turmeric, caffeine, and combinations thereof.

8. The method of claim 1, wherein the telomerase activator of at least one of the first or second pharmaceutical mixtures is epitalon or metformin.

9. The method of claim 1, wherein said T3 thyroid hormone is liothyronine.

10. A method of treating or preventing the progression of neurological disorders selected from the group consisting of epilepsy and Parkinson's disease comprising administering a first pharmaceutical mixture and a second pharmaceutical mixture to a subject in need thereof, each comprising;
an effective amount of one or more mTOR inhibitors, an effective amount of one or more BDNF inducers, an effective amount of a telomerase activator, and an effective amount of uridine 5'-monophosphate disodium;
and wherein said second pharmaceutical mixture further comprises an effective amount of one or more T3 thyroid hormones and the first pharmaceutical mixture does not contain any thyroid hormone;
wherein said second pharmaceutical mixture is administered three or fewer times per week and said first pharmaceutical mixture is administered on the days that the second pharmaceutical composition is not administered.

11. The method of claim 10, wherein the one or more mTOR inhibitors of at least one of the first or second pharmaceutical mixtures is selected from the group consisting of: an omega-3 fatty acid derivative, a biguanide antihyperglycemic agent, a flavonoid, a macrolide, and combinations thereof.

12. The method of claim 10, wherein the omega-3 fatty acid derivative of at least one of the first or second pharmaceutical mixtures is icosapent ethyl.

13. The method of claim 10, wherein the biguanide antihyperglycemic agent of at least one of the first or second pharmaceutical mixtures is metformin.

14. The method of claim 10, wherein the macrolide of at least one of the first or second pharmaceutical mixtures is rapamycin.

15. The method of claim 10, wherein the second pharmaceutical mixture further comprises a flavonoid.

16. The method of claim 10, wherein the one or more BDNF inducers of at least one of the first or second pharmaceutical mixtures is selected from the group consisting of: omega-3 fatty acid derivatives, biguanide antihyperglycemic agents, macrolides, resveratrol, vitamin B derivatives, quercetin, vitamin D derivatives, Bacopa monnieri leaf extract, curcumin, magnesium threonate, turmeric, caffeine, and combinations thereof.

17. The method of claim 10, wherein the telomerase activator of at least one of the first or second pharmaceutical mixtures is epitalon or metformin.

18. The method of claim 10, wherein said T3 thyroid hormone is liothyronine.

* * * * *